(12) United States Patent
Joe (10) Patent No.: US 9,237,385 B2
(45) Date of Patent: Jan. 12, 2016

(54) ELECTRONIC APPARATUS, CONDITIONAL ACCESS SYSTEM, AND CONTROL METHOD THEREOF

(75) Inventor: Seong-min Joe, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 469 days.

(21) Appl. No.: 13/602,504

(22) Filed: Sep. 4, 2012

(65) Prior Publication Data

US 2013/0166694 A1 Jun. 27, 2013

(30) Foreign Application Priority Data

Dec. 22, 2011 (KR) .................. 10-2011-0140614

(51) Int. Cl.
| | | |
|---|---|---|
| G06F 15/16 | (2006.01) | |
| H04N 21/6543 | (2011.01) | |
| H04N 21/4623 | (2011.01) | |
| H04N 21/443 | (2011.01) | |
| H04N 21/81 | (2011.01) | |

(52) U.S. Cl.
CPC ....... *H04N 21/6543* (2013.01); *H04N 21/4435* (2013.01); *H04N 21/4623* (2013.01); *H04N 21/8193* (2013.01)

(58) Field of Classification Search
CPC ............ H04L 63/00; H04L 29/06; H04L 9/00
USPC .................................. 709/219, 231; 713/200
See application file for complete search history.

(56) References Cited

U.S. PATENT DOCUMENTS

| | | | | |
|---|---|---|---|---|
| 6,016,348 | A * | 1/2000 | Blatter et al. ................. | 380/228 |
| 6,104,860 | A * | 8/2000 | Lee et al. ...................... | 386/213 |
| 6,108,422 | A * | 8/2000 | Newby et al. .................. | 380/47 |
| 6,560,340 | B1 | 5/2003 | Akins, III et al. | |
| 7,039,614 | B1 * | 5/2006 | Candelore ....................... | 705/57 |
| 7,523,145 | B2 * | 4/2009 | Willard et al. ................ | 725/134 |
| 7,607,022 | B1 * | 10/2009 | Qiu et al. ...................... | 713/189 |
| 7,809,942 | B2 * | 10/2010 | Baran et al. ................... | 713/160 |
| 7,896,241 | B2 * | 3/2011 | Bychkov et al. .............. | 235/381 |
| 8,490,155 | B2 * | 7/2013 | Jeong et al. ........................ | 726/2 |
| 8,589,685 | B2 * | 11/2013 | Moon et al. ................... | 713/168 |
| 8,594,333 | B2 * | 11/2013 | Ducharme et al. ............ | 380/277 |
| 8,694,773 | B2 * | 4/2014 | Jeong et al. ................... | 713/156 |
| 2002/0032775 | A1 * | 3/2002 | Venkataramaiah et al. .. | 709/225 |
| 2003/0196113 | A1 * | 10/2003 | Brown et al. ................. | 713/201 |

(Continued)

OTHER PUBLICATIONS

Search Report dated Apr. 4, 2013, issued by the European Patent Office in counterpart European Patent Application No. 12186456.5.

*Primary Examiner* — Ario Etienne
*Assistant Examiner* — Sahera Halim
(74) *Attorney, Agent, or Firm* — Sughrue Mion, PLLC (57) ABSTRACT

An electronic apparatus is provided. The electronic apparatus include: a memory unit which downloads a CAS client from a server and stores the CAS client, a communication unit which receives a message to change a storage location of the CAS client from the server, and a controller which changes a storage location of the CAS client and stores the storage location according to the message received from the server. The method includes downloading a CAS client from a server and storing the CAS client in a memory; receiving from the server a message to change a storage location of the CAS client; changing a storage location of the CAS client, and storing the changed storage location according to the message received from the server.

18 Claims, 5 Drawing Sheets

(56) References Cited

U.S. PATENT DOCUMENTS

| | | | |
|---|---|---|---|
| 2003/0226029 A1* | 12/2003 | Porter et al. | 713/200 |
| 2004/0076033 A1* | 4/2004 | Takahashi | 365/145 |
| 2005/0091690 A1* | 4/2005 | Delpuch et al. | 725/88 |
| 2005/0198662 A1* | 9/2005 | Endo et al. | 725/31 |
| 2006/0294250 A1* | 12/2006 | Stone et al. | 709/229 |
| 2007/0258589 A1* | 11/2007 | Kim | 380/204 |
| 2008/0005326 A1* | 1/2008 | Pinder et al. | 709/225 |
| 2008/0120666 A1* | 5/2008 | Guzman et al. | 725/110 |
| 2009/0100446 A1* | 4/2009 | Dekker et al. | 719/328 |
| 2009/0100490 A1* | 4/2009 | Nandhakumar | 725/114 |
| 2009/0106850 A1* | 4/2009 | Robert et al. | 726/30 |
| 2009/0151003 A1* | 6/2009 | Moon et al. | 726/27 |
| 2009/0183219 A1* | 7/2009 | Maynard et al. | 725/116 |
| 2010/0153711 A1* | 6/2010 | Koo et al. | 713/156 |
| 2010/0268964 A1* | 10/2010 | Carrel et al. | 713/189 |
| 2011/0247032 A1* | 10/2011 | Koo et al. | 725/27 |
| 2012/0036372 A1* | 2/2012 | Leclercq | 713/192 |
| 2012/0275599 A1* | 11/2012 | Cocchi et al. | 380/270 |
| 2012/0321080 A1* | 12/2012 | Candelore et al. | 380/201 |
| 2013/0007452 A1* | 1/2013 | Rodgers et al. | 713/168 |
| 2014/0136855 A1* | 5/2014 | Ducharme et al. | 713/193 |
| 2014/0189741 A1* | 7/2014 | Cansino et al. | 725/43 |
| 2014/0223484 A1* | 8/2014 | Song et al. | 725/44 |

\* cited by examiner

ELECTRONIC APPARATUS, CONDITIONAL ACCESS SYSTEM, AND CONTROL METHOD THEREOF

CROSS-REFERENCE TO RELATED APPLICATION

This application claims priority from Korean Patent Application No. 10-2011-0140614, filed on Dec. 22, 2011 in the Korean Intellectual Property Office, the disclosure of which is incorporated herein by reference in its entirety.

BACKGROUND

1. Field

Methods and apparatuses consistent with exemplary embodiments relate to an electronic apparatus, a conditional access system (hereinafter, referred to as a 'CAS'), and a control method thereof. More particularly, the exemplary embodiments relate to an electronic apparatus which can be provided with a CAS client in a downloading method, a CAS, and a method of controlling the apparatus.

2. Description of the Related Art

A conditional access system (hereinafter, referred to as a 'CAS') refers to a control system in which a system providing broadcast contents, such as cable, broadcast contents to only a subscriber who subscribes to a cable broadcast.

In order to provide a paid broadcast service, most of the current digital cable broadcasts use a cable card of a smart card format or a personal computer memory card international association (PCMCIA) card format according to how a conditional access (CA) is applied. However, since a related-art CAS distributes CAS software (or a CAS client image) offline through the smart card or the PCMCIA card, a predetermined time is required to re-issue a card when the CAS has a defect, and thus it is difficult to swiftly deal with the defect. Also, a problem exists in that an additional cost is incurred for the reissue of smart card.

In order to overcome the above disadvantages, interactive cable communication network-based downloadable conditional access system (DCAS) technology has been developed in recent years and developing the DCAS technology is an issue. The DCAS technology is not a technology in which a CAS provider installs selected CAS software in a smart card or a PCMCIA card and provides a paid broadcast service as in the related-art. The DCAS technology is a technology in which a security module for installing CAS software is mounted in a set-top box so that the CAS software is easily updated through an interactive cable communication network when the CAS software has a defect or when the CAS software needs to be version-updated. The DCAS may be called an exchangeable conditional access system (XCAS) in some situations.

However, since DCAS technology downloads the CAS software into a memory area of a set-top box and uses it, there is a problem that the corresponding memory area may be hacked and an illegally copied set-top box may be manufactured.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide an electronic apparatus which can be protected from external hacking and falsification of a CAS client, a CAS, and a method of controlling the apparatus.

According to an aspect of an exemplary embodiment, there is provided a method for controlling of an electronic apparatus, the method including: downloading a CAS client from a server and storing the CAS client in a memory, receiving from the server, receiving a message to change a storage location of the CAS client, changing a storage location of the CAS client and storing the changed storage location, according to the message received from the server.

The downloading and storing the CAS client may include storing the CAS client in a memory location, that is designated by the server.

The downloading and storing the CAS client may include dividing the CAS client into a plurality of objects and separately storing the plurality of objects in different memory locations.

The changing and storing the storage location of the CAS client may include changing storage locations of the plurality of CAS client objects which are separately stored in the different memory locations, and storing the changed storage locations, respectively, according to the message received from the server.

The changing and storing the storage location of the CAS client may include copying the plurality of CAS client objects which are separately stored in the different memory locations, storing the plurality of CAS client objects in changed locations according to the message received from a server and deleting the plurality of CAS client objects stored in prior locations.

The message received from the server to change the storage location of the CAS client may include receiving the message at a predetermined interval or when a predetermined event occurs.

The electronic apparatus may be implemented as a set-top box.

According to an aspect of another exemplary embodiment, there is provided a method for controlling a CAS system, which includes a server and an electronic apparatus, the method including: downloading, by the electronic apparatus, a CAS client from the server and storing the CAS client in a memory, transmitting, by the server, a message to change a storage location of the CAS client to the electronic apparatus, receiving, by the electronic apparatus, the message from the server, and changing a storage location of the CAS client and storing the changed storage location according to the message received from the server.

The downloading and storing the CAS client by the electronic apparatus may include dividing the CAS client into a plurality of objects and separately storing the plurality of objects in different memory locations.

The changing and storing the storage location of the CAS client by the electronic apparatus may include respectively changing storage locations of the plurality of CAS client objects which are separately stored in the different memory locations and storing the changed storage locations.

According to an aspect of still another exemplary embodiment, there is provided an electronic apparatus including: a memory unit which downloads a CAS client from a server and stores the CAS client, a communication unit which receives from the server a message to change a storage location of the CAS client, and a controller which changes a storage location of the CAS client and stores the storage location according to the message received from the server.

The controller may store the CAS client in a memory location that is designated by the server.

The controller may divide the CAS client into a plurality of objects and separately store the plurality of objects in different memory locations within the memory unit.

The controller may respectively change storage locations of the plurality of CAS client objects which are separately stored in the different memory locations, and store the storage locations.

The controller may copy the plurality of CAS client objects which are separately stored in the different memory locations and may store the plurality of CAS client objects in changed locations, may delete the plurality of CAS client objects stored in prior locations.

The communication unit may receive the message at a predetermined interval or upon the occurrence of a predetermined event.

The electronic apparatus may be implemented as a set-top box.

According to an aspect of still another exemplary embodiment, there is provided a CAS which includes a server and an electronic apparatus, the CAS including: an electronic apparatus which downloads a CAS client from the server and stores the CAS client in a memory, and the server which transmits a message to change a storage location of the CAS client to the electronic apparatus, wherein the electronic apparatus receives the message from the server, changes a storage location of the CAS client and stores the storage location according to the received message.

The electronic apparatus may divide the CAS client into a plurality of objects and may separately store the plurality of objects in different memory locations.

The electronic apparatus may respectively change storage locations of the plurality of CAS client objects which are separately stored in the different memory locations, and may store the storage locations.

An exemplary embodiment of the general inventive concept may include a method for controlling an electronic apparatus, the method including downloading and storing a conditional access system client; receiving from a message to change a storage location of the conditional access system client; and changing a storage location of the conditional access system client and storing the changed storage location according to the received message.

An exemplary embodiment may further include an electronic apparatus including a memory unit which downloads and stores a conditional access system client; a communication unit which receives a message to change a storage location of the downloaded and stored conditional access system client; and a controller which changes a storage location of the conditional access system client and stores the storage location according to the received message.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Hereinafter, exemplary embodiments will be described in greater detail with reference to the accompanying drawings.

In the following description, the same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 1:
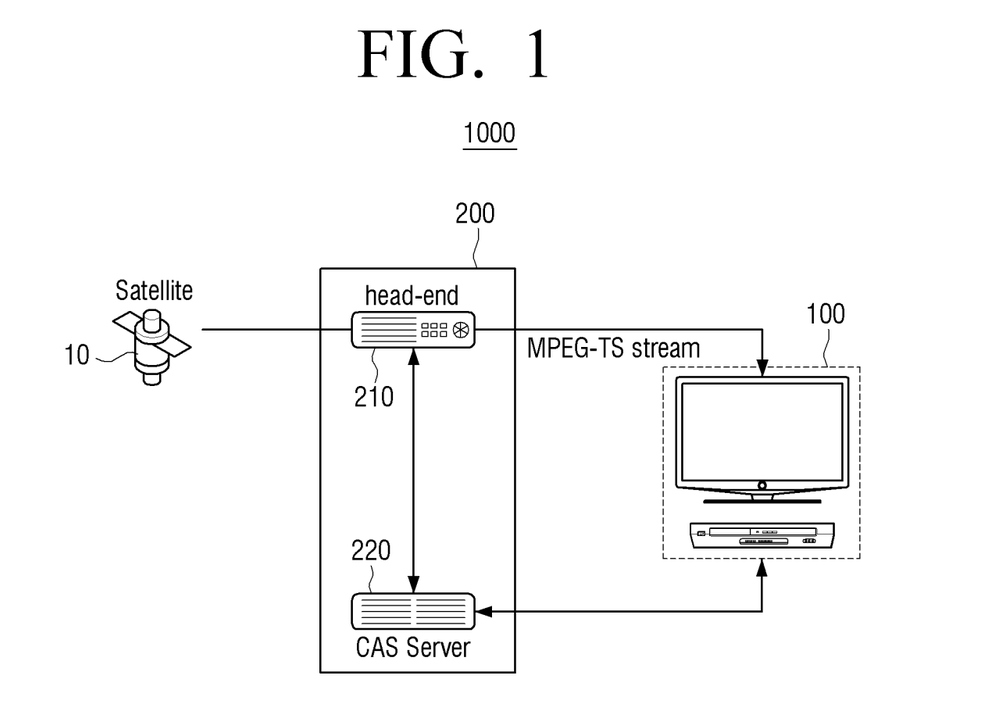
FIG. 1 is a diagram illustrating a CAS according to an exemplary embodiment.

FIG. 1 is a diagram illustrating a CAS according to an exemplary embodiment.

As shown in FIG. 1, a CAS 1000 according to an exemplary embodiment may include a server 200 and a client apparatus 100. The server 200 may include a head end 210 and a CAS server 220.

The CAS 1000 shown in FIG. 1 may be a DCAS or an XCAS that downloads a CAS client (or CAS software) into the client apparatus 100 and uses it.

The head end 210 includes a scrambler (not shown) to scramble broadcast content received from satellite 10 using a specific key.

The head end 210 may provide the CAS client to the client apparatus 100.

The CAS server 220 encrypts the specific key that is used by the head end 210 to scramble the broadcast content, thereby generating an entitlement control message (ECM), and encrypts a service key that is able to decrypt the encrypted specific key, thereby generating an entitlement management message (EMM).

The CAS server 220 encrypts a device key that is able to decrypt the encrypted service key and transmits the encrypted device key to the head end 210. The CAS server 220 encrypts the device key using an encryption key that is known between the server 200 and the client apparatus 100, and transmits the encrypted device key to the head end 210.

The head end 210 multiplexes the ECM, the EMM, and the device key which are transmitted from the CAS server 220 with the scrambled broadcast content, and modulates them, thereby generating a motion picture expert group (MPEG)-transport stream (TS). The head end 210 transmits the MPEG-TS to the client apparatus 100 using a coaxial cable net.

The head end 210 generates a message to change a storage location of the CAS client, which is downloaded into the client apparatus 100, and provides the message to the client apparatus 100. The message to change the storage location of the CAS client may be a message to change a storage address in a memory in which the CAS client is stored.

Figure 2:
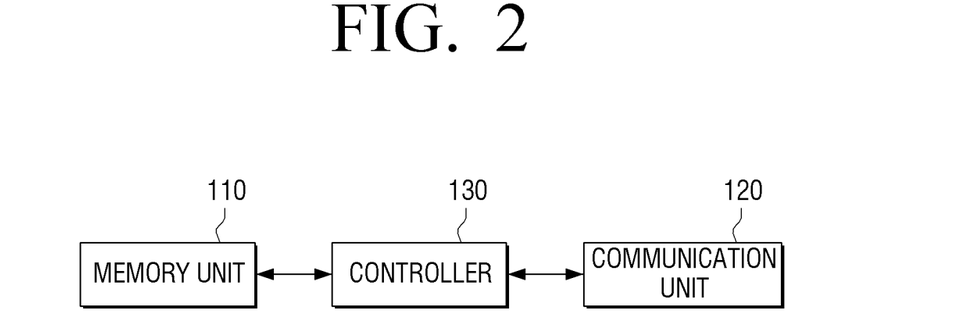
FIG. 2 is a block diagram illustrating an electronic apparatus according to an exemplary embodiment.

A single client apparatus is illustrated in FIG. 2, but this is merely an example. The head end may transmit data to a plurality of client apparatuses through a coaxial cable net.

The client apparatus 100 may download the CAS client for executing a CAS function and store the CAS client.

The client apparatus 100 may store a security module and a security module boot loader to perform a monitoring function of the security module.

The client apparatus 100 may change a storage location of the CAS client in the memory according to a message transmitted from the head end 210. Accordingly, the CAS client can be more safely protected from hacking.

FIG. 2 is a block diagram illustrating an electronic apparatus according to an exemplary embodiment.

Referring to FIG. 2, an electronic apparatus 100 includes a memory unit 110, a communication unit 120, and a controller 130. The electronic apparatus 100 may be realized by the client apparatus 100 shown in FIG. 1.

The electronic apparatus 100 may be implemented by a set top box. However, this should not be considered as limiting and the electronic apparatus 100 may be a stand-alone apparatus such as a digital television (TV), a video tape recorder (VTR), a video cassette recorder (VCR), a digital video recorder (DVR), and a digital video disc (DVD) player, or an apparatus that is embedded in a DTV, an A/V display apparatus, or other receiving apparatuses.

The memory unit 110 functions to download a CAS client from a server (not shown) and store the CAS client. The memory unit 110 may be implemented as, but not limited to, a non-volatile memory such as a flash memory.

The CAS client may extract information (for example, a control word) for descrambling a scrambled TS using information included in the above-described EMM and ECM. A detailed description of the function of the CAS client is omitted.

The memory unit 110 may store a security module and a security module boot loader to perform a monitoring function of the security module.

The communication unit 120 communicates with a server (not shown), which provides a variety of information regarding the CAS.

In particular, the communication unit 120 may receive from the server (not shown) a message to change a storage location of the CAS client from the server (not shown).

In this case, the communication unit 120 may receive the message at a predetermined interval or when a predetermined event occurs.

The controller 130 controls an overall operation of the electronic apparatus 100.

In particular, the controller 130 may change a storage location of the CAS client stored in the memory unit 110 and store the storage location according to a received message.

The controller 130 may store the CAS client in a memory location that is designated by the server (not shown) in the memory unit 110 when downloading the CAS client. That is, the controller 130 may store the CAS client in a memory address location designated by the server (not shown).

The controller 130 may divide the CAS client into a plurality of objects and separately store the plurality of objects in different memory locations in the memory unit 110, when downloading the CAS client. That is, the controller 130 may separately store the plurality of CAS client objects in a plurality of different memory address locations within the memory unit 110. In this case, the controller 130 may separately store the plurality of CAS client objects in a plurality of different memory address locations designated by the server (not shown).

The controller 130 may change storage locations of the plurality of CAS client objects, which are separately stored in the different memory locations, and may store the storage locations according to a message received from the sever (not shown).

Specifically, the controller 130 may copy the plurality of CAS client objects, which are separately stored in the different address locations in the memory unit 110, store the plurality of CAS client objects in the changed address locations according to a message received from the server (not shown), and may delete the plurality of CAS client objects stored in the prior locations. The received message may include information regarding the changed address locations of the plurality of CAS client objects in the memory unit 110.

Figure 3A:
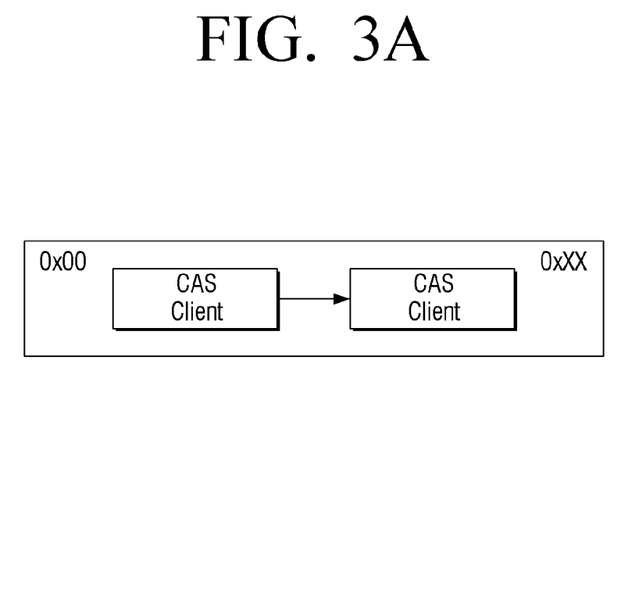
FIGS. 3A and 3B are views to explain a method for changing a storage location of a CAS client according to various exemplary embodiments.
Figure 3B:
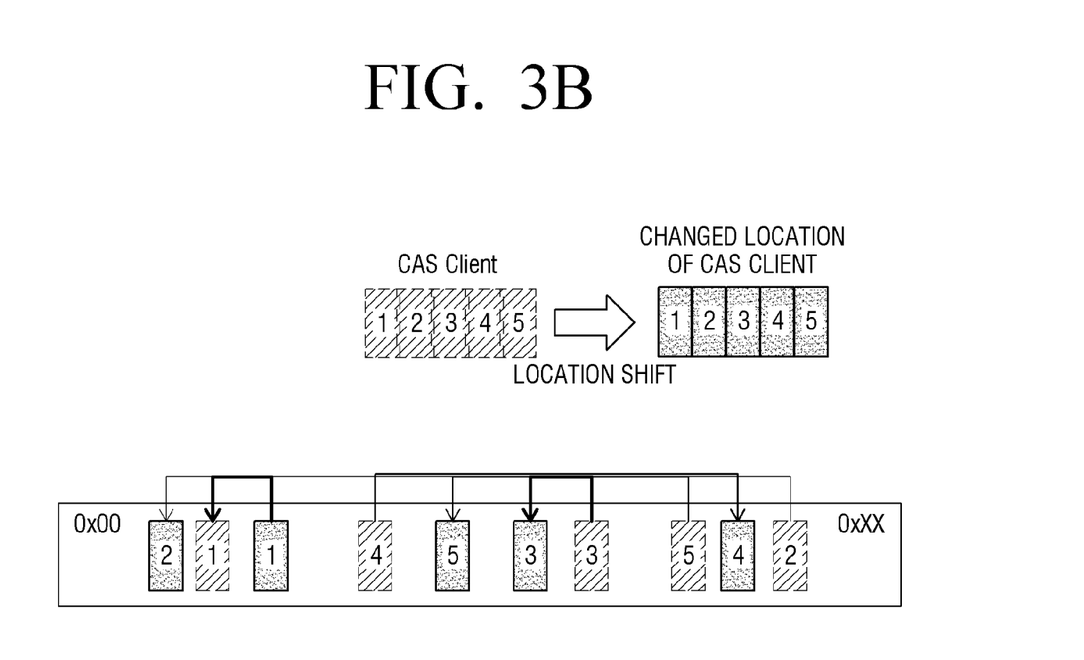

FIGS. 3A and 3B are views to explain a method for changing a storage location of a CAS client according to various exemplary embodiments.

FIG. 3A illustrates a case in which a CAS client downloaded from a server is stored in a designated address location in a memory as a single object.

After a CAS client is initially downloaded and stored, if a message to change a storage location of the CAS client is received from a server, a storage location of the CAS client is changed to an address location included in the message. In this case, the CAS client stored in the prior address location is copied to the changed address location and the CAS client stored in the prior address location is deleted.

FIG. 3B illustrates a case in which a CAS client downloaded from a server is divided into a plurality of objects and the plurality of objects are separately stored in designated address locations in a memory.

After a CAS client is initially downloaded, it is divided into a plurality of objects, and the plurality of objects are separately stored. In response to a message to change a storage location of the CAS client being received from a server, storage locations of the plurality of CAS client objects are changed to address locations included in the message. In this case, the plurality of CAS client objects stored in the prior address locations are copied to the changed address locations, and the CAS client stored in the prior address locations is deleted.

Figure 4:
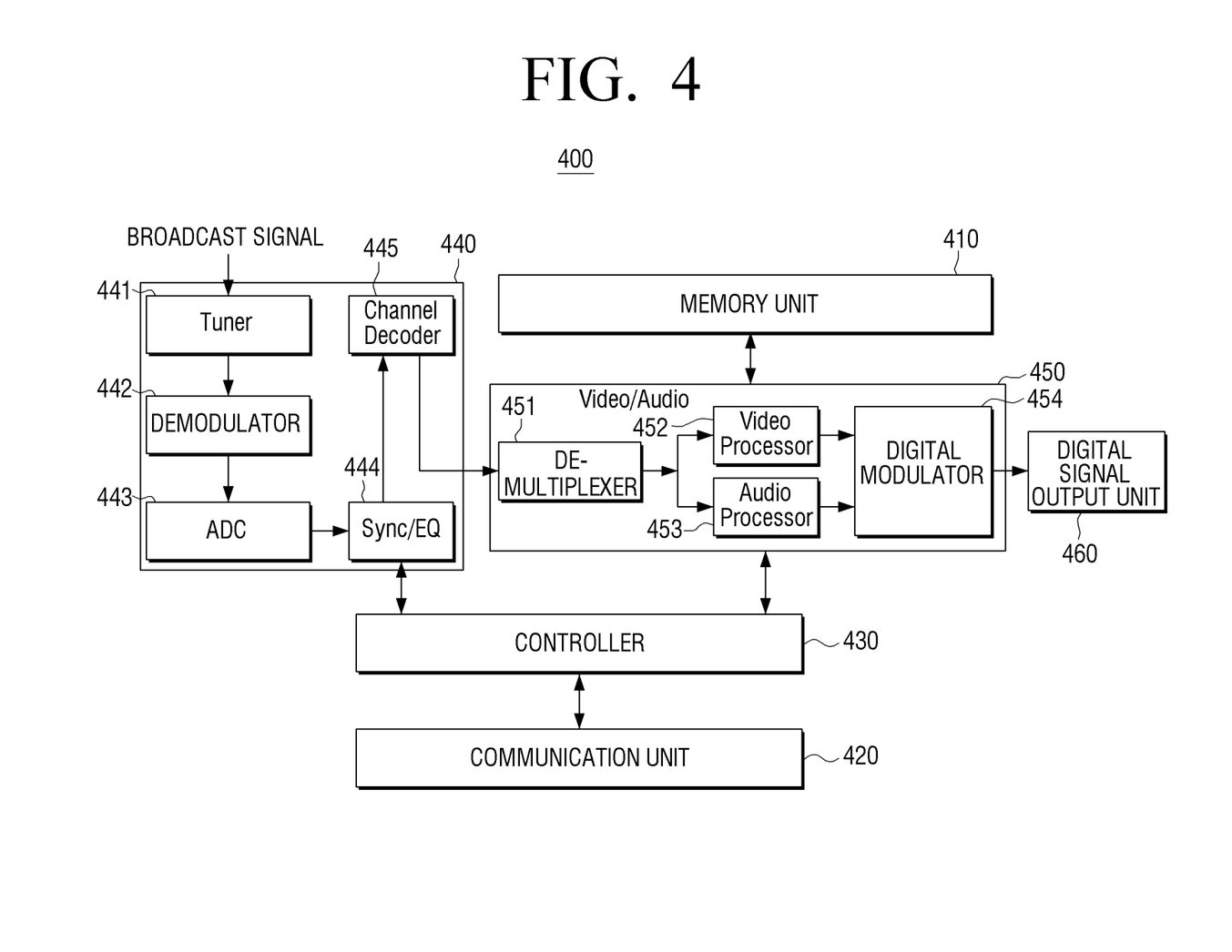
FIG. 4 is a block diagram illustrating an example of an electronic apparatus according to an exemplary embodiment.

FIG. 4 is a view illustrating an example of the electronic apparatus according to an exemplary embodiment.

In FIG. 4, the electronic apparatus 100 is implemented as a set-top box 400.

As shown in FIG. 4, the set-top box 400 may include a memory unit 410, a communication unit 420, a controller 430, a signal receiver 440, a signal processor 450, and a digital signal output unit 460.

The memory unit 410 functions to download a CAS client from a server (not shown) and stores the CAS client. The memory unit 410 may be implemented as a non-volatile memory such as a flash memory.

The memory unit 410 may store a security module and a security module boot loader to perform a monitoring function of the security module.

The communication unit 420 communicates with the server (not shown), which provides a variety of information regarding the CAS.

In particular, the communication unit 420 may receive from the server (not shown) a message to change a storage location of the CAS client from the server (not shown).

In this case, the communication unit 420 may receive the message at a predetermined interval or when a predetermined even occurs.

The controller 430 controls an overall operation of the electronic apparatus 400.

In particular, the controller 430 may change a storage location of the CAS client stored in the memory unit 410 and store the storage location according to a message received from the server.

Also, the controller 430 may store the CAS client in a memory location that is designated by the server (not shown) in the memory unit 410 when downloading the CAS client. That is, the controller 430 may store the CAS client in a memory address location designated by the server (not shown).

The controller 430 may divide the CAS client into a plurality of objects and separately store the plurality of objects in different memory locations in the memory unit 410, when downloading the CAS client.

The controller 430 may change storage locations of the plurality of CAS client objects which are separately stored in the different memory locations, and store the storage locations according to a message received from the server (not shown).

The signal receiver 440 receives broadcast signals of a terrestrial broadcast, a cable broadcast and a satellite broadcast of each country. The broadcast signals may be received in at least one of an analog method and a digital method. The digital method may receive the signals in the form of quadrature amplitude modulation (QAM), orthogonal frequency division multiplexing (OFDM), vestigial side band (VSB), and quadrature phase shift keying (QPSK).

The VSB may use various transmission schemes such as an advanced television system committee (ATSC) system for U.S., a DVB-T system based on coded orthogonal frequency modulation (COFDM) for Europe, an ISDB-T system based on bandwidth segmented transmission OFDM (BST-OFDM) for Japan, and terrestrial digital multimedia television broadcasting (DMB-T), advanced digital television broadcast-terrestrial (ADTV)-T, BDB-T, CDTB-T, and synchronized multi-carrier CDMA (SMCC) for China.

For example, in response to a broadcast signal being received through an antenna, the signal receiver 440 sychronizes a digital broadcast signal and an analog broadcast signal or a signal of a specific scheme, from among the digital broadcast signals, thereby receiving and demodulating a desired broadcast signal.

The signal receiver 440 may output, through an external interface, channel information regarding a channel selected by the user, that is, a signal of a selected channel, under control of the controller 430.

To achieve this, the signal receiver 440 may include a part or all of a television tuner module 441, a demodulator 442, an analog-digital (AD) converter 443, a synchronizer and an equalizer (Sync/EQ) 444, and a channel decoder 445.

The tuner module 441 includes a tuner that synchronizes a broadcast signal of a specific scheme and outputs the broadcast signal.

The demodulator 442 demodulates the broadcast signal received through the tuner.

The AD converter 443 converts information. The synchronizer and the equalizer 444 synchronize a channel selected by the user and correct a distortion characteristic of the channel. The synchronizer and the equalizer 445 may operate under the control of controller 430.

The signal processor 450 receives the broadcast signal for the specific channel provided from the signal receiver 440 and divides the broadcast signal into video data and audio data. The video data and the audio data may be stored in the memory unit 410 under control of the controller 430. In response to the signal processor 450 including a microprocessor, the signal processor 450 may manage the video data and the audio data through the microprocessor. That is, the microprocessor may receive the video data and the audio data and store the video data and the audio data in the memory unit 410 again, or may read out the stored data and perform signal processing. The signal processing may include decoding, scaling and frame interpolation.

The signal processor 450 modulates the broadcast signal in a digital channel format and outputs the broadcast signal. In this process, the signal processor 450 may standardize and process the broadcast signal in a digital method of a specific country. For example, the signal processor 450 may modulate the video data and the audio data in the digital channel format such as QAM, VSB, QPSK, and OFDM according to the ATSC standard, and may provide the data to the digital signal output unit 460.

To achieve this, the signal processor 450 may include a de-multiplexer 451, video and audio processors 452 and 453, and a digital modulator 454. The de-multiplexer 451 may receive the broadcast signal for the selected channel and store the broadcast signal in association with the memory unit 410, and may divide the broadcast signal respectively into video data and audio data for each program of the selected channel and provide the video data and the audio data to the video processor 452 and the audio processor 453.

The video processor 452 and the audio processor 453 perform signal processing with respect to the video data and the audio data. The signal processing may include decoding, scaling and frame interpolation.

The digital modulator 454 modulates the broadcast signal in a digital format using at least one scheme of QAM, VSB, OFDM, and QPSK, and outputs the broadcast signal. The digital modulator 454 may standardize and process the broadcast signal to conform to a specific digital method.

The signal output unit 460 outputs the video data and the audio data that are modulated in the digital format by the signal processor 450. The signal output unit 460 may be provided in a form of a connector or jack, and may be connected to a separate display apparatus (not shown) such as a digital broadcast receiver, through the connector or jack. As a result, the display apparatus (not shown) receives broadcast signals of various channels and displays the broadcast signals.

Figure 5:
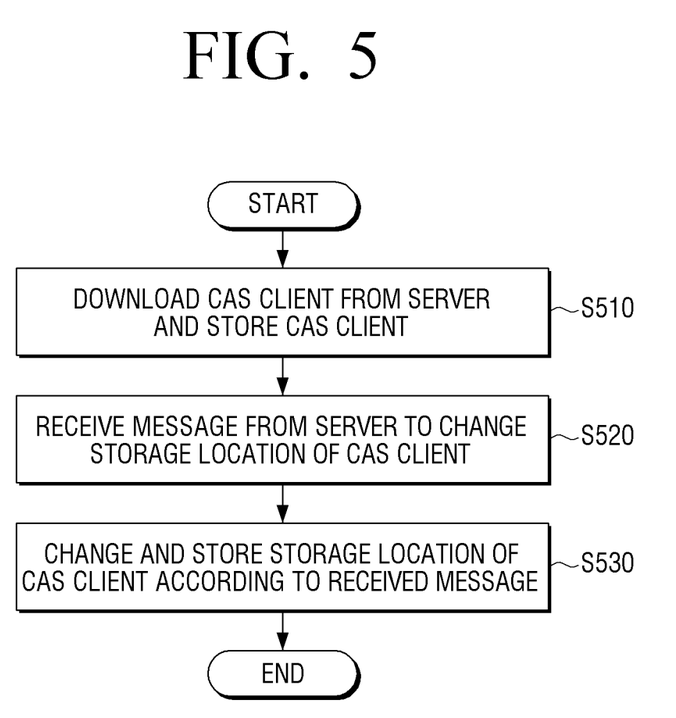
FIG. 5 is a flowchart illustrating a control method of an electronic apparatus according to an exemplary embodiment.

FIG. 5 is a flowchart illustrating a control method of an electronic apparatus according to an exemplary embodiment.

According to the control method of the electronic apparatus shown in FIG. 5, a CAS client is downloaded from a server and is stored in a memory (S510). The electronic apparatus may be implemented as, but not limited to, a set-top box.

A message to change a storage location of the CAS client is received from the server (S520).

Thereafter, a storage location of the CAS client is changed and stored according to the received message (S530).

In operation S510 to download and store the CAS client, the CAS client may be stored in a memory location that is designated by the server.

The CAS client may be divided into a plurality of objects and may be separately stored in different memory locations.

In operation S530 to change and store the storage location of the CAS client, storage locations of the plurality of CAS client objects, which are separately stored in the different memory locations, may be changed and stored according to a message received in operation S520.

Specifically, in operation S530 to change and store the storage location of the CAS client, the plurality of CAS client objects which are separately stored in the different memory areas may be copied and stored in changed locations according to a message received in operation S520, and the plurality of CAS client objects stored in the prior locations may be deleted.

In operation S520 to receive the message to change the storage location of the CAS client from the server, the message may be received at a predetermined interval or upon occurrence of a predetermined event.

Figure 6:
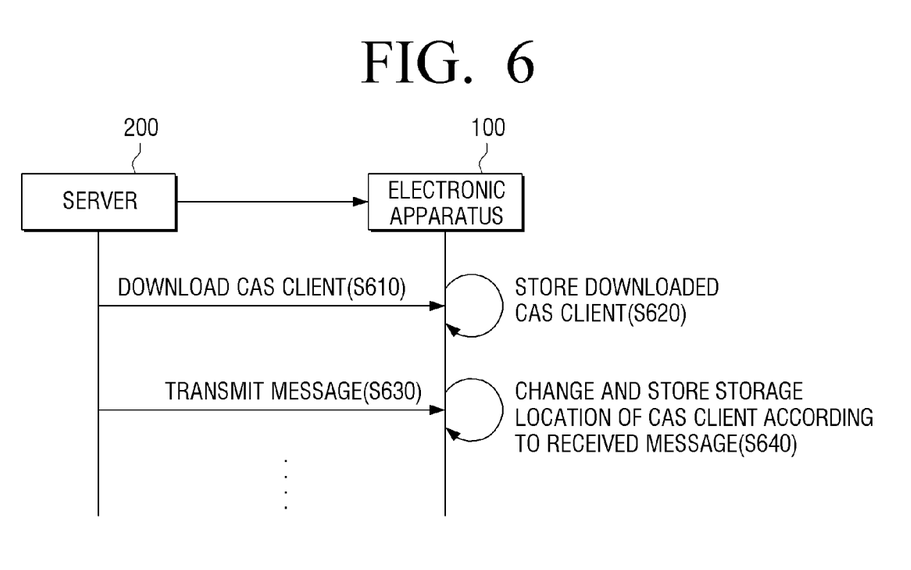
FIG. 6 is a sequence diagram to explain an operation of a CAS including a server and an electronic apparatus according to an exemplary embodiment.

FIG. 6 is a sequence diagram to explain an operation of a CAS including a server and an electronic apparatus according to an exemplary embodiment.

Referring to FIG. 6, the electronic apparatus 100 downloads a CAS client to execute a CAS function from the server 200 (S610).

The electronic apparatus 100 may store the CAS client downloaded in operation S610 in a memory (S620). In this case, the CAS client may be stored in a memory address location that is designated by the server 200.

In some situations, the electronic apparatus 100 may divide the CAS client downloaded in operation S610 into a plurality of objects and separately store the plurality of objects in the memory.

The server 200 may transmit a message to change a storage location of the CAS client in the electronic apparatus 100 to the electronic apparatus 100 (S630). In this case, the message may include information regarding a changed location of the CAS client. In particular, in response to the CAS client being divided into a plurality of objects and the plurality of objects are separately stored, the message may include information regarding a changed location of each of the plurality of objects.

The electronic apparatus 100 may change a storage location of the CAS client and store the storage location according to the message received from the server 200 (S640). Specifically, in response to the CAS client not being divided and being a single object, the entire CAS client may be copied to a changed memory address location and stored at one time. If the CAS client is divided into a plurality of objects and the plurality of objects are stored separately, the objects may be copied to changed memory address locations and stored, respectively.

The message transmitted in operation S630 may be transmitted at a predetermined interval.

The present inventive concept may include a computer readable recording medium that includes a program to execute the control method of the electronic apparatus described above. The computer readable recording medium includes all types of recording apparatuses that store data readable by a computer system. Examples of the computer readable recording medium are a read only memory (ROM), a random access memory (RAM), a CD-ROM, a magnetic tape, a floppy disk, and an optical data storage apparatus. The computer readable recording medium may store a code that is distributed in a computer system connected to a network and is readable by a computer in a distributed manner, and may execute the code.

As described above, since the CAS client is not always located in a specific area, the CAS client can be more safely protected from hacking.

Also, the location of the CAS client in the memory is periodically changed. Accordingly, even in response to an electronic apparatus being illegally copied, by hacking, into a memory area, the illegally copied electronic apparatus cannot be used after a predetermined time elapses because the location of the CAS client is changed.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for controlling an electronic apparatus including a memory and a processor, the method comprising:
    downloading, by the processor of the electronic apparatus, a conditional access system (CAS) client from a server and storing, by the processor of the electronic apparatus, the CAS client in a location in the memory of the electronic apparatus;
    receiving, by the electronic apparatus, from the server, a message to change a storage location of the CAS client stored in the location in the memory, the message including information on a changed location of the CAS client; and
    changing, by the processor of the electronic apparatus, a storage location of the CAS client stored in the location in the memory by storing the stored CAS client in the changed storage location in the memory according to the information on the changed location included in the message received from the server,
    wherein the downloading and storing the CAS client comprises dividing the CAS client into a plurality of objects and separately storing the plurality of objects in different memory locations in the memory.

2. The method as claimed in claim 1, wherein the downloading and storing the CAS client comprises storing the CAS client in a memory location that is designated by the server.

3. The method as claimed in claim 1, wherein the changing the storage location of the CAS client comprises changing storage locations of the plurality of CAS client objects which are separately stored in the different memory locations in the memory, and storing the plurality of CAS client objects in the changed storage locations in the memory according to the message received from the server.

4. The method as claimed in claim 3, wherein the changing the storage location of the CAS client comprises copying the plurality of CAS client objects which are separately stored in the different memory locations in the memory, storing the plurality of CAS client objects in changed locations in the memory according to the message received from the server, and deleting the plurality of CAS client objects stored in prior locations.

5. The method as claimed in claim 1, wherein the receiving from the server the message to change the storage location of the CAS client comprises receiving the message at a predetermined interval or upon occurrence of a predetermined event.

6. The method as claimed in claim 1, wherein the electronic apparatus is implemented as a set-top box.

7. A method for controlling a "conditional access system" (CAS) system, which comprises a server and an electronic apparatus including a memory and a processor, the method comprising:
    downloading, by the processor of the electronic apparatus, a CAS client from the server and storing, by the processor of the electronic apparatus, the CAS client in a location in the memory of the electronic apparatus;
    transmitting, by the server, a message to change a storage location of the CAS client stored in the location in the memory included in the electronic apparatus, the message including information on a changed location of the CAS client; and receiving, by the electronic apparatus, the message from the server, and changing, by the processor of the electronic apparatus, a storage location of the CAS client stored in the memory by storing the stored CAS client in the changed storage location in the memory according to the information on the changed location included in the message received from the server, wherein the downloading and storing the CAS client by the electronic apparatus comprises dividing the CAS client into a plurality of objects and separately storing the plurality of objects in different memory locations in the memory.

8. The method as claimed in claim 7, wherein the changing the storage location by the electronic apparatus comprises changing storage locations of the plurality of CAS client objects which are separately stored in the different memory locations in the memory and storing the plurality of CAS client objects in the changed storage locations in the memory.

9. An electronic apparatus comprising:
a controller;
a memory unit controlled by the controller, which downloads a CAS client from a server and stores the CAS client in a location in the memory unit; and
a communication unit controlled by the controller, which receives from the server a message to change a storage location of the CAS client stored in the location in the memory unit, the message including information on a changed location of the CAS client,
wherein the controller changes a storage location of the CAS client stored in the location in the memory unit by storing the stored CAS client in the changed storage location in the memory unit according to the information on the changed location included in the message received from the server, and
wherein the controller divides the CAS client into a plurality of objects and separately store the plurality of objects in different memory locations in the memory unit.

10. The electronic apparatus as claimed in claim 9, wherein the controller controls to stores the CAS client in a memory location that is designated by the server.

11. The electronic apparatus as claimed in claim 9, wherein the controller changes storage locations of the plurality of CAS client objects which are separately stored in the different memory locations, and stores the plurality of CAS client objects in the storage locations in the memory unit, respectively.

12. The electronic apparatus as claimed in claim 11, wherein the controller copies the plurality of CAS client objects which are separately stored in the different memory locations in the memory unit and stores the plurality of CAS client objects in changed locations in the memory unit, and deletes the plurality of CAS client objects stored in prior locations.

13. The electronic apparatus as claimed in claim 9, wherein the communication unit receives the message at a predetermined interval or upon occurrence of a predetermined event.

14. The electronic apparatus as claimed in claim 9, wherein the electronic apparatus is implemented as a set-top box.

15. A conditional access system (CAS) which comprises a server and an electronic apparatus including a processor and a memory, wherein, the processor of the electronic apparatus downloads a CAS client from the server and stores the CAS client in a location in the memory of the electronic apparatus; and
the server transmits a message to change a storage location of the CAS client stored in the location in the memory to the electronic apparatus,
wherein the electronic apparatus receives the message from the server, and the processor of the electronic apparatus changes a storage location of the CAS client stored in the location in the memory by storing the stored CAS client in the changed storage location in the memory according to the information on the changed location included in the message received from the server, and
wherein the electronic apparatus divides the CAS client into a plurality of objects and separately stores the plurality of objects in different memory locations in the memory.

16. The CAS as claimed in claim 15, wherein the electronic apparatus changes storage locations of the plurality of CAS client objects which are separately stored in the different memory locations, and stores the plurality of CAS client objects in the changed storage locations in the memory.

17. A method for controlling an electronic apparatus including a memory and a processor, the method comprising:
downloading, by the processor of the electronic apparatus, a conditional access system (CAS) client and storing, by the processor of the electronic apparatus, the CAS client in a location in the memory of the electronic apparatus;
receiving, by the electronic apparatus, from a message to change a storage location of the CAS client stored in the location in the memory, the message including information on a changed location of the CAS client; and
changing, by the processor of the electronic apparatus, a storage location of the CAS client stored in the location in the memory by storing the stored CAS client in the changed storage location in the memory according to the information on the changed location included in the received message,
wherein the downloading and storing the CAS client by the electronic apparatus comprises dividing the CAS client into a plurality of objects and separately storing the plurality of objects in different memory locations in the memory.

18. An electronic apparatus comprising:
a controller;
a memory unit controlled by the controller, which downloads and stores a conditional access system (CAS) client in a location in the memory unit; and
a communication unit controlled by the controller, which receives a message to change a storage location of the CAS client stored in the location in the memory unit,
wherein the controller changes a storage location of the CAS client stored in the location in the memory by storing the stored CAS client in the changed storage location in the memory according to the information on the changed location included in the received message, and
wherein the controller divides the CAS client into a plurality of objects and separately store the plurality of objects in different memory locations in the memory unit.

* * * * *